Aug. 22, 1967  N. C. ALLEN  3,336,818
METHOD AND APPARATUS FOR AUTOMATICALLY DYNAMICALLY
BALANCING ROTATING COMPONENTS
Filed Aug. 6, 1965  3 Sheets-Sheet 1
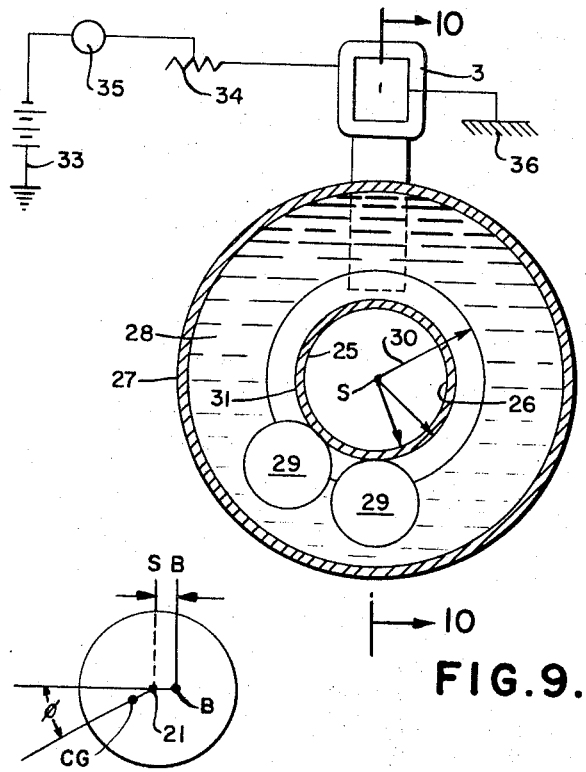
FIG. 9.
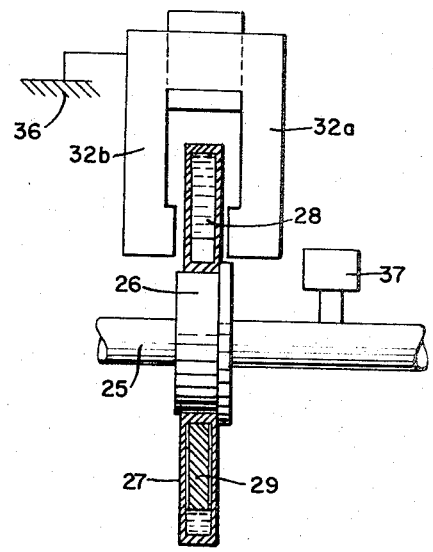
FIG. 10.
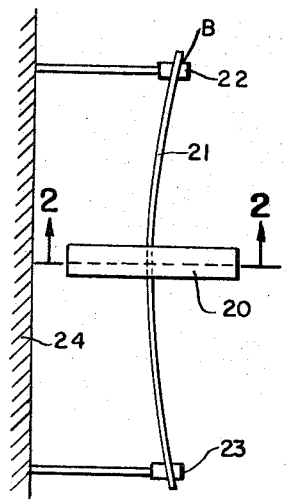
FIG. 2.
FIG. 1.
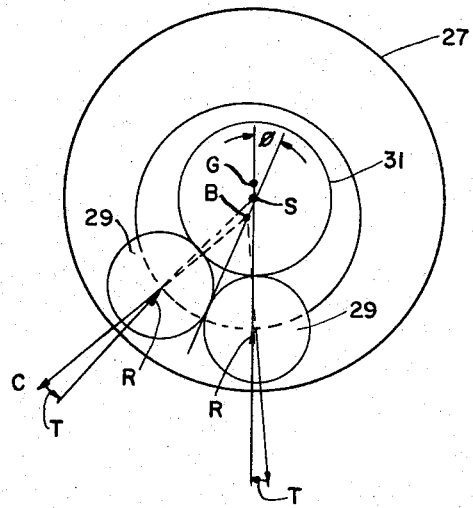
FIG. 11.
INVENTOR
Norman C. Allen
BY
Holcombe, Wetherill & Brisebois
ATTORNEYS

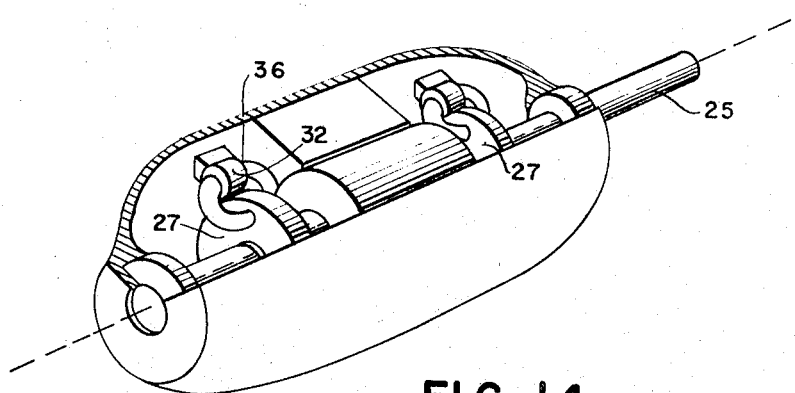
FIG. 14.
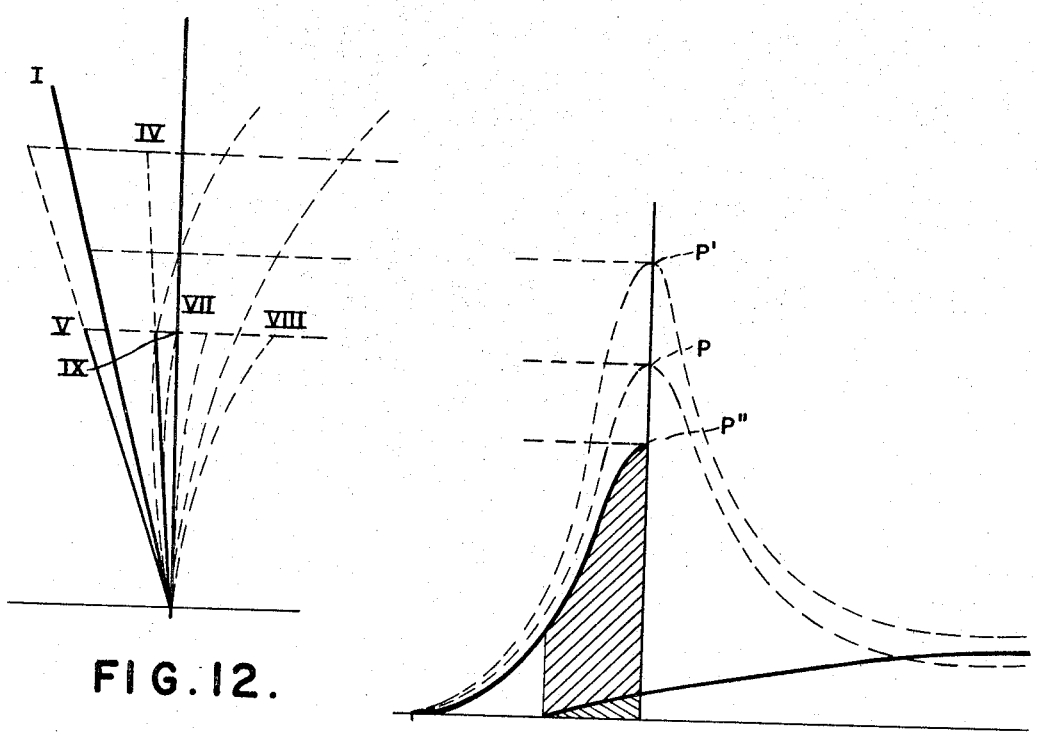
FIG. 12.
FIG. 13
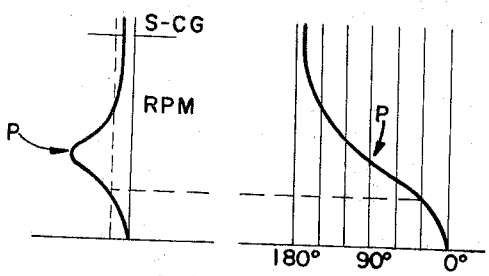
FIG. 4.
FIG. 3.

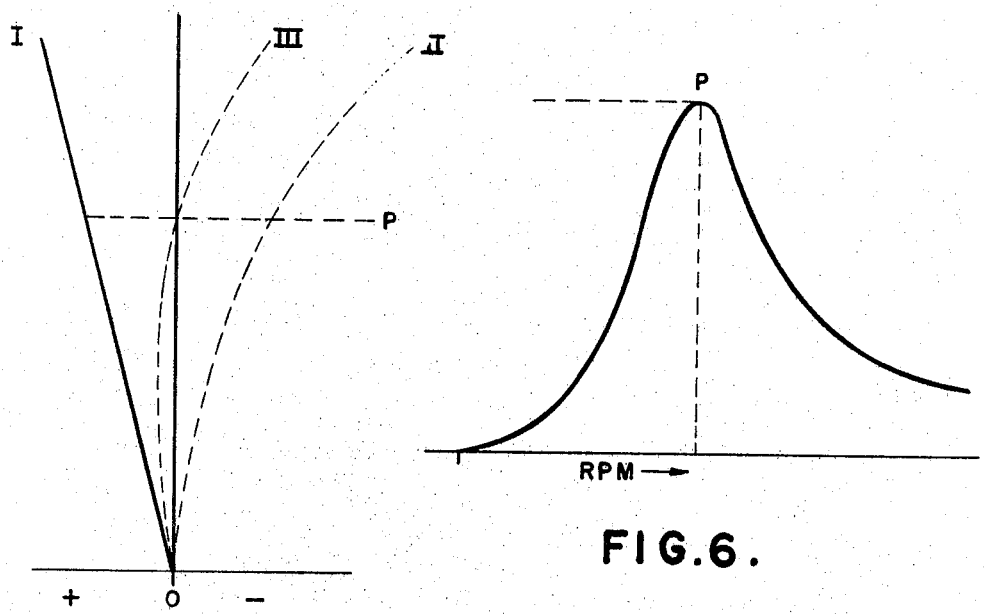
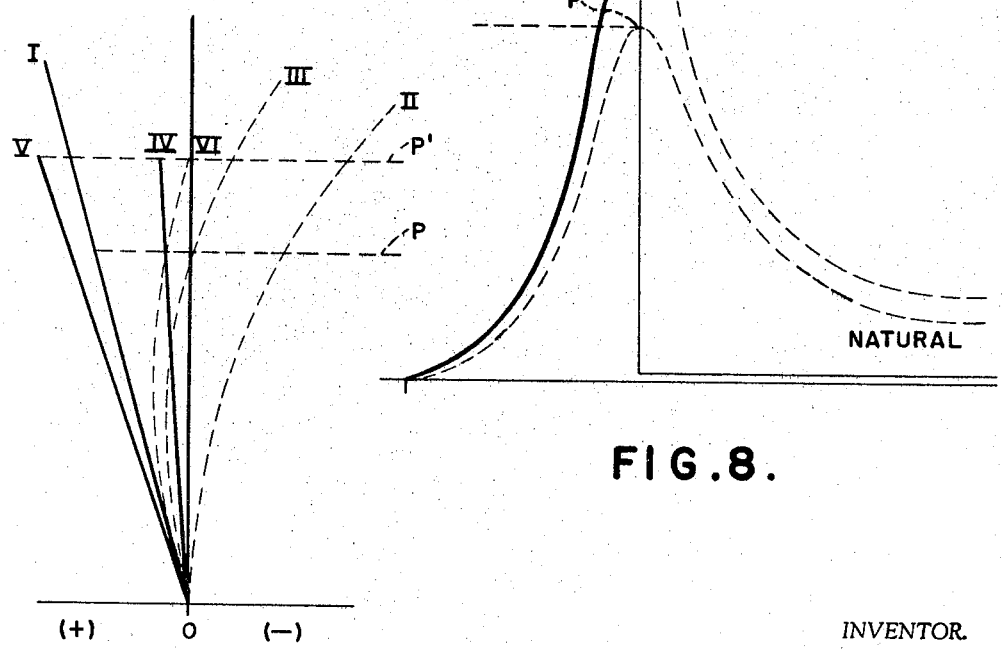

United States Patent Office 3,336,818
Patented Aug. 22, 1967

3,336,818
METHOD AND APPARATUS FOR AUTOMATICALLY DYNAMICALLY BALANCING ROTATING COMPONENTS
Norman C. Allen, 221 W. Gardenia Drive, Phoenix, Ariz. 85021
Filed Aug. 6, 1965, Ser. No. 477,836
8 Claims. (Cl. 74—573)

The present invention relates to a method and apparatus for automatically dynamically balancing rotating components and has for an object to eliminate vibration due to out-of-balance rotation and particularly it is adapted to high speed components where small residual imbalances must be dealt with or in those situations where the shaft loads shift or change in response to an external influence such as temperature gradients or creepage of component material.

As technological advancements are made in fields of power engineering and in strength of materials, higher and higher speeds of rotation are being used to increase horsepower-to-weight ratios. High speed turbines and centrifugal process techniques are but two areas which are currently expanding their fields of application but have encountered severe difficulties and engineering problems due to equipment stresses imposed by residual dynamic imbalances.

Individuals who are working in the field will readily agree that dynamic balance of equipment is tedious business and is usually attained only after many trials and corrections have been made. These corrections must be made to bring the geometric symmetry of the rotating component into coincidence with a rotational axis established by the design of the equipment. Even though great care is exercised in the manufacture of these machine elements small errors are observed which at high speed exert large inertial forces on the structure of the machine. Sometimes these forces constitute safety hazards due to failure of material or at least increased wear and/or material fatigue. The small errors which cause these forces must be reduced to some tolerance value determined by design requirements and this process is often expensive and time consuming because the finished components must be brought up to speed and the amplitudes and phase angles measured and mass must be either added or removed to appropriately counteract the residual unbalance mass. If the mechanical system has several degrees of freedom, such as in large turbines, this process can become very complicated since the system must be brought to operating speed through a succession of measurements and corrections.

The observed effect of an unbalanced mass on a rotating component is to produce a deflection or bending of the shaft which carries the load. Uniquely enough this shaft deflection does not always occur in a direction corresponding to the position of the unbalanced mass. The angle between the unbalanced mass and the displacement is called the phase angle. Exact values of the phase angle and the displacement depend in parameters of the system and are well described in the literature. In order to arbitrarily and automatically balance this rotating system we must make use of the displacement and its phase angle and evolve a method to use these indicators of imbalance to redistribute the rotating mass.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a schematic of a single degree of freedom mass suspended on a shaft which is free to rotate in bearings carried by a static frame.

FIGURE 2 is a section view taken through the lines 2—2 of FIGURE 1 and shows the relationship between the bearing centerline, the shaft center at the mass and the center of gravity of the suspended mass.

FIGURE 3 is a curve plotted to show the amplitude of the displacement relative to the rate of rotations and illustrates the ambiguous nature of this function.

FIGURE 4 is a curve indicating that phase angle must be known before the displacement ambiguity can be resolved.

FIGURE 5 is a graphic presentation of energy per cycle relationships for a regular viscously damped system for a selected value of damping.

FIGURE 6 plots the amplitude versus frequency function for the system shown in FIGURE 5.

FIGURE 7 shows energy per cycle plot due to the presence of an unclamped automatic balancer which operates above the critical speed.

FIGURE 8 plots the amplitude versus frequency functions for the natural system compared to that for a unit which is balanced above critical speed.

FIGURE 9 is an end view of the automatic balancing element constructed in accordance with the present invention with parts broken away and parts shown in section.

FIGURE 10 is a vertical section of the apparatus of FIGURE 9 taken on the line 10—10 in FIGURE 9.

FIGURE 11 shows spacial relationship of component elements when vibration amplitude is large during operation below critical speed.

FIGURE 12 shows energy per cycle plot when magnetically actuated balancer is attached to rotor.

FIGURE 13 plots the amplitude versus frequency functions comparing natural response with actual response of the configuration of FIGURE 12.

FIGURE 14 is a perspective sketch of a typical application of the apparatus of the present invention as applied to the rotor of an electric motor.

Referring more particularly to the drawings and for the moment to FIGURES 1 and 2, the response of a mechanical system in the presence of an unbalanced mass has been well covered in the literature but may briefly be summarized to introduce this new concept. Rotationally symmetric mass 20 is carried on a shaft 21 which can turn in bearings 22, 23, rigidly supported by a static frame 24. Where the centerline of the bearings 22, 23 penetrates the rotating mass 20 is the point about which we will reference events in space. Unfortunately, the point where the shaft penetrates the mass does not coincide with the center of the gravity of the mass 20 which causes an unbalance. Upon rotating this arrangement centrifugal force acting on mass 20 begins to bend the shaft an amount which depends on its stiffness.

FIGURE 1 shows an exaggerated bend in the shaft. The bearing centerline B, the point where the shaft center S attaches to the mass and the center of gravity CG of the mass 20 are shown in FIGURE 2. FIGURE 2 also shows an angle phi between the line B–21 and the line 21–CG which is called the phase angle.

As the speed of rotation of this system is varied, and a plot of the radius is swept out by the point S about the center B, a curve resembling that of FIGURE 3 is generated indicating that for one value of amplitude there exists two rotational rates for those values of amplitude greater than S–CG and less than the peak value P. This ambiguity in rotational rate is due to the unseemly behavior of the phase angle phi between shaft center S and the mass center CG. The variation in this angle as rate is increased is shown in FIGURE 4 and it will be noted that the phase angle phi is 90 angular degrees when the peak displacement amplitude occurs at P.

This peculiar peak at P in FIGURE 4 can best be explained by reference to FIGURE 5. In FIGURE 5, Curve I in that figure shows how much energy a fixed mass possesses as its virbation amplitude is increased. Curve II shows how much energy must be supplied to overcome regular viscous damping which increased proportional to the square of the amplitude and exhibits a negative sense with respect to Curve I. For a steady state condition the sum of these two energies must be zero. The sum of Curves I and II are shown in Curve III and it will be observed to cross the zero energy line at an amplitude corresponding to the peak P in FIGURE 6. It will be noted that for any value of displacement below P in FIGURE 5 each cycle of motion produces work. In a natural system, the only place this work can go is into increasing the amplitude of the motion; consequently, the system moves up toward the stable amplitude point P. Curve III also shows that if for some reason the amplitude becomes too large, or in other words, goes above the point, the system must get energy from somewhere. The only place a natural system can obtain this energy is to take it from the system amplitude and again the motion tends towards the stable point P. Such response produces the amplitude versus frequency curve shown in FIGURE 6.

To this point, attention has been directed to the regular behavior of an unbalanced viscously damped single degree rotor. The main points to be retained are the behavior of the phase angle as a function of the speed and that energy considerations can resolve the resulting amplitude ambiguity. A study of FIGURE 5 indicates that if a rotating mass can be made to perform work on an external system (as in the case of viscous damping) the point P falls to lower amplitudes. Ideally, instead of working on an external system the energy in the vibration can be used to redistribute the mass about the rotating body in such a way that it would be perfectly balanced. In such a system a vibration amplitude would be reduced and would ultimately go to zero after enough work had been done rearranging the mass. Since the ideal condition cannot be achieved below the critical speed, the best possible compromise is sought. In this situation relatively small amount of mass is added to the mass of the rotor, within certain limitations, is free to react to the inertial forces within the rotating assembly. Properly designed, this free forming mass will distribute itself in such a manner to be perfectly balanced at rotational rates greater than the critical speed at P in FIGURE 6. On the assumption that in such a system that the mass redistribution adds linearally to the available energy below the critical speed as shown by Curve IV in FIGURE 7, the displacement is increased to a greater value P' as is shown by the addition of Curves I and IV to produce Curve V. However, due to shift in phase angle beyond the point P', the inertial forces suddenly find themselves acting on the movable masses in such a way as to move them around where they counteract the unbalance. At the point where they take up these new positions all vibrations cease. All the curves terminate at the amplitude P' to show this change in mode of operation. The amplitude versus speed characteristics are compared with the natural response in FIGURE 8, where it is obvious that the vibration increased before it decreased beyond the critical speed.

The best compromise situation would retain this characteristic of self balance at rates greater than the critical speed but would somehow suppress the increased amplitudes created below the critical speed.

Referring now to FIGURES 9 and 10, an apparatus for carrying out the teaching of the present invention is shown in which a shaft 25 whose center is S has a mounting surface 26 which is concentric with the shaft S and supports a washer shaped container 27 which is constrained to rotate with the shaft. The container 27 forms an annular cavity in which a liquid 28 and two discs 29 have been placed. When the shaft is rotated the liquid assumes a surface of approximate radius 30 due to centrifugal forces. As drawn the volumetric density of the liquid 28 is greater than the discs 29, that is, the specific gravity is greater, which will cause the discs to float in the liquid. A buoyancy therefore develops which presses the discs against the innermost surface 31 of the cavity. The housing 27 is caused to run in a magnetic field emanating from the electromagnet 32 which is rigidly attached to the same surface which holds the bearings 22, 23 in which the shaft turns. The electromagnet 32 may be supplied from a battery 33 through a variable reostat 34 for increasing or decreasing magnetic field intensity and a milliammeter is in circuit to show concurrent strength in the field. The electromagnet has a pair of poles $32^a$ and $32^b$ which extend down the sides of the casing 27.

As the shaft rotates carrying the housing 27 with it, the shaft is bent in the direction modified by the greater phase angle of the unbalanced mass schematically indicated at 37. In view of the centrifugal forces set up for rotation with the casing 27 an air space exists between the liquid 28 and the innermost portion 31. The inertial forces developed by the rotation cause the free surface of the liquid 28 to generate about the bearing centerline, but the surface 31 is structurally concentric with the center of the shaft. Deflections of the shaft cause an eccentricity to develop between surface 31 and surface of the liquid which is due to centrifugal force which will be substantially concentric with the surface 31.

Referring now to FIGURE 11 the relationship is shown between elements at a certain speed below the critical speed. The centrifugal force acting on the discs 29 is shown as vector C and the reaction force against surface 31 due to the buoyancy is shown as vector R. Since C and R act along different directions we observe a tangential component T developing which will cause the masses to move around to the side in general opposition with the unbalanced mass 37 where they will come into contact and the opposing vectors will cancel. Since the discs 29 are lighter than the liquid 28 this aggravates the imbalance and consequently the vibration amplitude would increase if no other force were acting. If the masses could not escape from this position, vibration amplitude would be greater for all speeds which is shown as the dotted line extension of the curve beyond P' in FIGURE 8. Curve I in FIGURE 12 shows the inertial energy due to the initial system imbalance. Curve IV shows the contribution due to the shift in the discs 29. Curve V is the sum of Curves I and IV. These effects are in agreement with previous comments associated with FIGURE 8.

As the deflected shaft 25 turns the magnetic field produced by the electromagnet 32 appears to be moving in a circular arc around the point B in FIGURE 11 which causes a cyclical variation in the volume which is common to both the liquid and the magnetic field. If the liquid does not like to stay in a magnetic field, i.e. it is a diamagnetic material, the rotor must do work to push the liquid into the magnetic field which is similar to the work that the rotor had to do against viscous damping. Not only will this effect obtain energy from the vibration but it will set up a shear force in the liquid. The liquid 28 will not support the shear so it tries to migrate around to the other side of the cavity which is where it should be to counterbalance the mass 37. The characteristic interaction of the magnetic field and the liquid in terms of the energy per cycle is shown in Curve VII of FIGURE 12 which adds to the viscous damping already present in Curve II. The sum of Curves II and VII is shown in Curve VIII. Combining Curve V with Curve VIII produces Curve IX which indicates the maximum amplitude the system will attain below its critical speed and shows that an important reduction in amplitude has been achieved. When the amplitude P″ is attained, the phase angle passes through 90 degrees, the forces on the free masses line up properly with the inertial forces, and the self balancing mode of operation is encountered. At this and all higher speeds the magnet could be removed and vibration free performance would continue. If the magnetic field is not removed another effect sets in to unbalance the system at very high rates. This can be understood by remembering that the magnetic field is still causing shear in the liquid which causes the liquid to flow tangentially around the cavity with ever increasing force as the speed is increased. This motion of the liquid tries to drag the discs 29 around to the light side where they should not be. The uppermost curve in FIGURE 13 shows the amplitude versus speed function if a fixed unbalanced mass equivalent to this case were present. The rising asymptotic curve shows the resulting response to the magnetic drag at high rotational rates.

Throughout the preceding discussion several simplifying assumptions are implicit in the analysis and no attempt has been made to present higher order phenomena, such as, system response in the presence of angular acceleration. One interesting dynamic effect is suggested by the shaded portion of low amplitude curve in FIGURE 13 which is significant but too involved to treat with here. Suffice to say that many modifications of the basic idea are possible concerning material selection, design configuration, and interface parameters with the multitude of applications which would benefit from the use of this technique. This concept will not automatically attain perfect balance when the magnetic element is passively employed but as demonstrated in FIGURE 13 significantly improves dynamic performance when used in this manner. Since its simplicity predicates low manufacturing costs and its configuration would not seriously effect most existing equipment designs it should prove to be an important new method of reducing dangerous and costly equipment vibrations. A typical application example is shown in FIGURE 14 where two such balancing elements are shown installed on the rotor of an electric motor being actuated by two magnets which are fixed to the stator housing.

Other methods of operations are possible if the magnetic field is varied. There are a number of parameter choices since the magnetic field can be switched on-and-off or applied proportionally to functions of time, amplitude, angular velocity, phase angle, etc. It is difficult to specify system response to such input functions but some of the more significant application concepts are:

By way of example only and not restrictive in nature, the fluids employed may be mercury and water, a liquid alloy formed with mercury and bismuth and the material of which the discs are made are plastic, iron, aluminium, beryllium and graphite.

In general, for best performance, we want the magnetic effects on these discs to be identical to that on the liquid but exhibit the maximum relative mass difference (centrifugal force on the discs minus buoyancy force on the disc) and configured such that it adds the least possible mass to the rotating assemblage; therefore, if we use a Hg-Bi alloy liquid we might want to use beryllium discs or possibly a graphite disc which has been plated outside to increase its conductivity. It is also possible to make these discs out of a magnetic material (either hard or soft depending on the desired response) but this makes the system very sensitive to the magnet means.

In keeping with the idea that work must expend to suppress the systems natural tendency to develop large amplitude displacements, a magnet is placed such that shaft deformations cause greater coupling between the fluid and the field on the side that is "flying out."

The nature of this coupling must be discussed in greater detail. Several things occur when liquid runs in a magnetic field. First of all each atom of the liquid acts as a loop circuit due to its electron structure; consequently, a counter E.M.F. is set up and a repulsing force results which causes the liquid to try to escape the magnetic field. This "diamagnetic" property of liquids does not produce strong repulsing forces. Another effect of the liquid running through the magnetic field has to do with the population of conduction electrons in a fixed volume of the liquid. These conduction electrons have a motion with respect to the field so a force is exerted on them in accordance with well known physical principles governing motors. The effect of this force which interests us is that it attempts to drag the liquid around in the direction opposite the rotation. So we see that when an imbalance cause the shaft to deflect the liquid builds up on the heavy side which below critical speed is flying out and increasing the coupling with the magnetic field. Both the diamagnetism and the secondary current properties of the liquid are trying to push it to the opposite side where it belongs. At high angular rates this pumping action can become a significant force at practical magnetic field values. Referring to energy lost and gained we can draw FIGURES 12 and 13 where Curve I is energy required from outside sources to drive the imbalanced rotor, Curve II is energy irrecoverably lost from the system due to damping, Curve III is the sum of I and II and predicts the natural peak amplitude P that the rotor alone would exhibit (shown as a function of r.p.m. in FIGURE 13). Curve IV represents the energy required to drive the sum of the rotor and the "adaptive balancer" assemblies we are going to bolt on, and combining this with Curve II yields Curve V which indicates an increased vibration peak at P′; however, at this peak the self balance mode of operation develops and all vibration ceases. When the magnetic field is applied it causes the system to respond as though the damping had been increased to a new value represented by Curve VI (the difference between Curve II and Curve VI is the amount of work performed by the external magnetic field on the system) which combined with Curve IV causes a reduction in amplitude to the value P″, and again, the self balancing mode of operation sets in but at this point the effect of the magnetic field is to upset the stable situation so the vibration free condition is not realized as shown by the rising curve beyond P″ in FIGURE 13. This effect is totally indifferent to where the imbalance mass is located around the rotor. So we see that significant reduction of the vibration amplitude has been achieved without establishing the exact amount and location of excess mass and if we want to bother we could remove the field (which would be real easy in the case of an electromagnet) and operate in the vibration free mode once the critical speed has been passed.

What this class of new devices utilizes is the uniqueness of the phase angle with respect to the displacement. One readily recognizes that the phase angle always lies between 0° and 180°, this implies that work is always done on the system to oppose displacement, further it is performing this work to directly oppose vibration and also to cause redistribution of the mass to a more stable geometry. In the speed region around 10,000 r.p.m. and higher this technique should find important application since many of our newer wheels are running at these rates.

Although I have disclosed herein the best forms of the invention known to be at this time, I reserve the right to all such modifications and changes as may come within the scope of the following claims.

What is claimed is:

1. For use with a shaft to be dynamically balanced which shaft is rotatably supported between bearings carried by a static frame, an apparatus for damping torsional vibrations of rotating shaft; comprising a casing about said shaft and being secured for rotations therewith, a fluid within said casing having the property that its viscosity may be varied in a magnetic field, a pair if vibration damping discs whose specific gravity is less than that of the fluid carried in said casing in said fluid and positioned to bear against the shaft upon rotation of said shaft when the discs float in said liquid and bear against the shaft, and magnetic means adapted to be carried by said static frame and positioned to subject said fluid to a magnetic field whereby the buoyant characteristics of the fluid may be increased so that the damping discs are brought into more forceful engagement with the shaft as vibrations increase.

2. An apparatus as claimed in claim 1, wherein the magnetic means radial and radially tangential to the casing containing the fluid and damping discs and said magnetic means is carried by the static frame.

3. An apparatus as claimed in claim 1, wherein the fluid contains Mercury.

4. An apparatus as claimed in claim 1, wherein the damping discs are of the group of beryllium, carbon, graphite and plastic.

5. An apparatus as claimed in claim 1, wherein the shaft is a rotating machine having a rotor and stator and at least two casings are employed, one secured to the shaft at each end of the rotor mass and there are two electromagnets, one straddling each casing and being secured to the stator frame.

6. The method of dynamically balancing a rotating component comprising
   (a) entraining the rotary component to a viscous damping medium,
   (b) adding mass around about the rotating component and being movable relative thereto said mass being added in the viscous medium, and subjecting the rotary component and the viscous medium to a magnetic field generated from a magnetic source on a static frame,
   (c) subjecting the mass to the inertial forces generated by rotational forces derived from rotary motion of the viscous damping medium due to entrainment between the damping medium and the rotary component thereby acting upon the added mass whereby the added mass will move relatively about the rotating component to counteract the unbalance of the rotating component.

7. The method of claim 6, wherein the specific gravity of the added mass is lower than that of the viscous damping medium whereby the mass will float in the damping medium and engage the rotating component to damp vibrations of unbalance therefrom.

8. The method of claim 6 comprising the additional step of confining the movable masses to an annular track in an assembly which is entirely free to move about with respect to the main body of the rotating member to be balanced and constructed of a ferromagnetic material, which internal assembly is subjected to buoyant forces by a liquid constituent and which is acted upon by an external magnetic means adapted to be carried on a static frame, the composite effect being to achieve dynamic balance and suppress lateral vibration of the rotating member to which the device is attached.

References Cited
UNITED STATES PATENTS

| | | | |
|---|---|---|---|
| 2,341,695 | 2/1944 | Critchfield | 74—572 |
| 2,603,103 | 7/1952 | Sohon et al. | 74—572 |
| 3,166,356 | 1/1965 | Sutherland et al. | 74—573 |

FRED C. MATTERN, JR., *Primary Examiner.*

W. S. RATLIFF, *Assistant Examiner.*